(12) United States Patent
Urry

(10) Patent No.: US 6,521,372 B2
(45) Date of Patent: *Feb. 18, 2003

(54) PRISMATIC ELECTROCHEMICAL CELL AND BATTERY

(75) Inventor: Lewis F. Urry, Elyria, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 206 days.

This patent is subject to a terminal disclaimer.

(21) Appl. No.: 09/734,446

(22) Filed: Dec. 11, 2000

(65) Prior Publication Data

US 2001/0000238 A1 Apr. 12, 2001

Related U.S. Application Data

(63) Continuation of application No. 09/110,119, filed on Jul. 2, 1998, now Pat. No. 6,168,883.
(60) Provisional application No. 60/062,356, filed on Oct. 15, 1997.

(51) Int. Cl.[7] .................................................. H01M 6/42
(52) U.S. Cl. ...................... 429/159; 429/158; 429/163; 429/168
(58) Field of Search ................................. 429/163, 165, 429/167, 168, 175, 176, 149, 156, 158, 159, 206, 224, 229

(56) References Cited

U.S. PATENT DOCUMENTS

| | | |
|---|---|---|
| 327,878 A | 10/1885 | Holtzer |
| 380,855 A | 4/1888 | Brewer |
| 432,973 A | 7/1890 | Brewer |
| 494,852 A | 4/1893 | Fitch |
| 520,033 A | 5/1894 | Burnham |
| 3,069,489 A | 12/1962 | Carmichael et al. ......... 136/133 |
| 4,460,666 A | 7/1984 | Dinkler et al. .............. 429/236 |
| 4,959,280 A | 9/1990 | Amthor ....................... 429/27 |
| 5,248,571 A | 9/1993 | Rampel et al. ............. 429/206 |
| 5,302,110 A | 4/1994 | Desai et al. ................... 429/96 |
| 5,344,724 A | 9/1994 | Ozaki et al. .................. 429/94 |
| 5,422,201 A | 6/1995 | Georgopoulos ............. 429/170 |
| 5,466,546 A | 11/1995 | Pensabene et al. ......... 429/223 |
| 5,489,493 A | 2/1996 | Urry |
| 5,490,867 A | 2/1996 | Kozawa et al. |
| 5,537,733 A | 7/1996 | Kozawa et al. ............. 29/623.5 |
| 5,803,933 A | 9/1998 | Kilb .......................... 29/623.1 |
| 5,896,647 A | 4/1999 | Shkuratoff ................. 29/623.2 |
| 6,168,883 B1 * | 1/2001 | Urry .......................... 429/159 |

FOREIGN PATENT DOCUMENTS

| | | |
|---|---|---|
| DE | 3246968 | 7/1984 |
| GB | 2234673 | 2/1991 |

OTHER PUBLICATIONS

George Wood Vinal, Sc.D., "Primary Batteries," New York, John Wiley & Sons, Inc. and London, Chapman & Hall, Limited, 1951, pp. 20–21. No date (specific) available.

* cited by examiner

Primary Examiner—Stephen Kalafut
Assistant Examiner—Raymond Alejandro
(74) Attorney, Agent, or Firm—Russell H. Toye, Jr.

(57) ABSTRACT

A battery having an array of rectangular cells with cylindrical ends housed in a rectangular battery container and a battery having a single rectangular electrochemical cell with a cylindrical end. Each cell has a rectangular section substantially housing the active cell materials and a cylindrical end with a round cover/seal assembly assembled thereto.

20 Claims, 3 Drawing Sheets

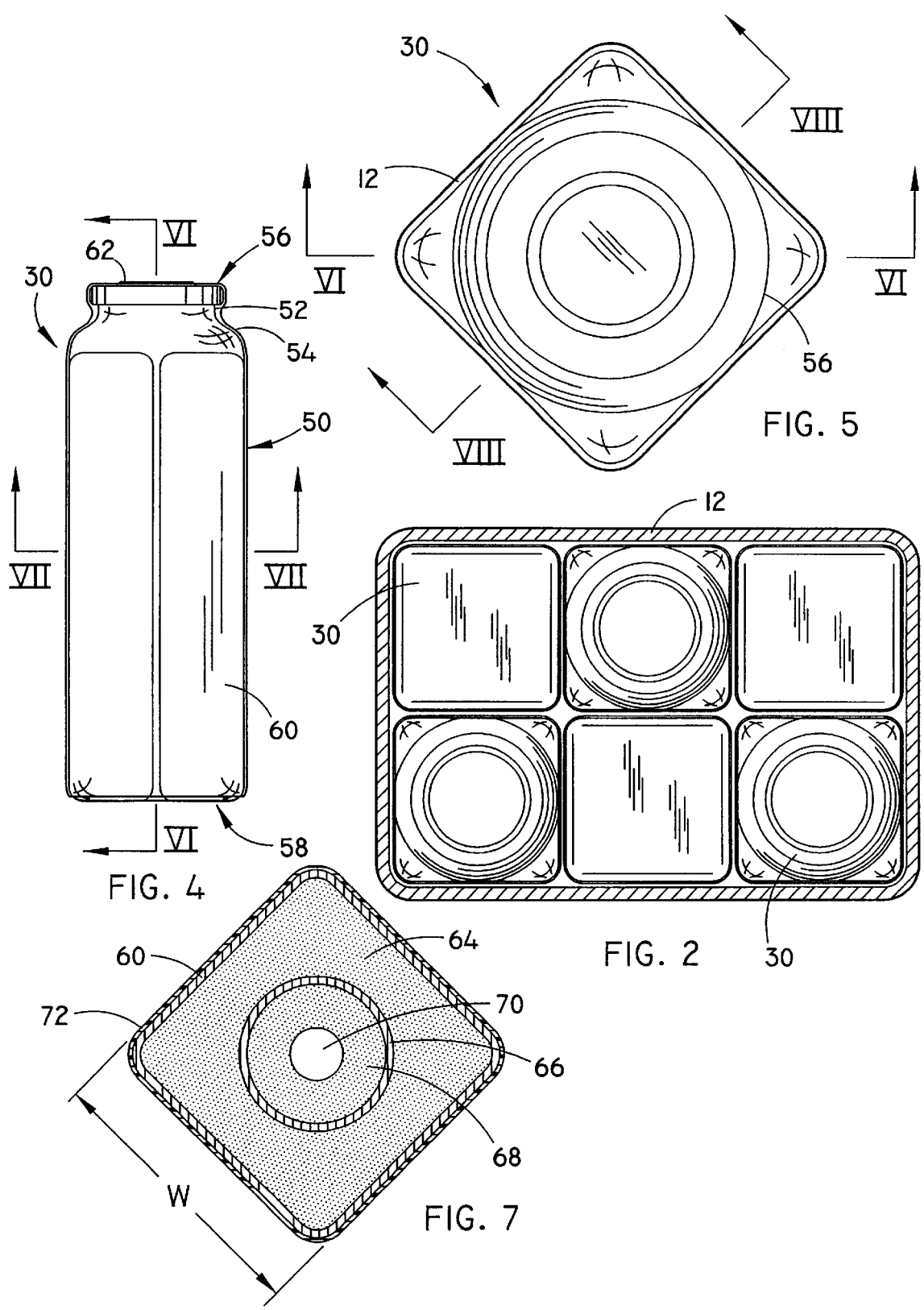

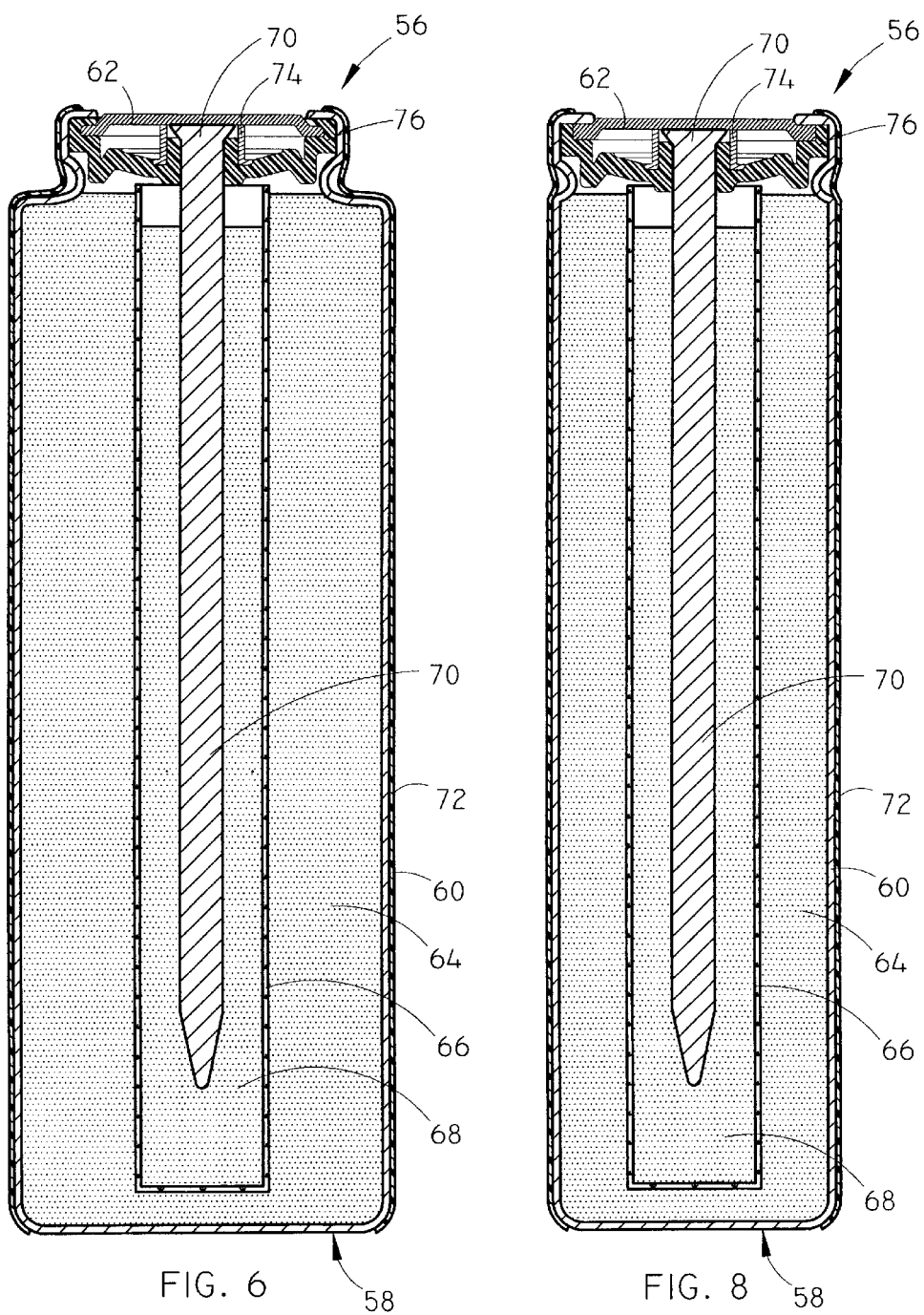

PRISMATIC ELECTROCHEMICAL CELL AND BATTERY

CROSS-REFERENCE TO RELATED APPLICATIONS

This application is a continuation of application Ser. No. 09/110,119, filed on Jul. 2, 1998, now U.S. Pat. No. 6,168,883 which claims the benefit of U.S. Provisional Application No. 60/062,356, filed Oct. 15, 1997.

BACKGROUND OF THE INVENTION

The present invention generally relates to an electrochemical cell and battery and, more particularly, to an electrochemical cell and an assembly of multiple cells in a rectangularly housed battery.

Conventional alkaline batteries commonly employ cylindrical cells, each generally having a cylindrically shaped steel can provided with a positive cover at one end and a negative cover at the opposite end. The cylindrical cell often includes a cathode preferably formed of a mixture of manganese dioxide, graphite, potassium hydroxide solution, deionized water, and a TEFLON® solution, formed about the interior side surface of the cylindrical steel can. A cup-shaped separator is usually disposed about the interior surface of the cathode. An anode, typically formed of zinc powder, a gelling agent, and other additives, is dispensed with electrolyte solution within the separator.

Standard alkaline cells are commercially available for providing an open circuit voltage of about 1.5 volts. When a higher voltage is required, it is common practice to combine multiple cells to form a battery having the required voltage. In so doing, a plurality of cells are commonly housed in a container and connected in series, with external terminals attached to the container and making contact with the series connected cells. In particular, the standard rectangular-housed, 9-volt battery, which is commonly used in smoke detectors and portable electronic devices, includes six, 1.5-volt cells connected in series. One example of a rectangular battery employs two stacks of three cylindrical cells disposed parallel to each other as is disclosed in U.S. Pat. No. 4,959,280 entitled "Battery Assembly," which is hereby incorporated by reference. It is also known to employ six, 1.5-volt cylindrical cells arranged in parallel with each other in a 2×3 array. However, the use of multiple, parallel disposed cylindrical cells housed together within a rectangular container results in unused space between adjacent cells, as well as between each cell and the inside walls of the battery container.

A primary goal in designing alkaline batteries is to increase the service performance of the cell. The service performance is the length of time for the cell to discharge under a given load to a specific voltage at which the cell is no longer useful for its intended purpose. Commercially available alkaline cells and batteries commonly have an external size that is defined by industry standards, thereby limiting the ability to increase the amount of active materials within a given cell and confining the volume available in a multiple cell battery. However, conventional batteries often do not optimize volume consumption within the housing of the battery. Accordingly, the need to find new ways to increase service performance remains the primary goal of the cell and battery designers.

SUMMARY OF THE INVENTION

The present invention improves the performance of a cell and a rectangularly housed, multiple cell battery by providing the cell with a prismatic can, preferably of a rectangular configuration, having an open end to accommodate a cover. To achieve this and other advantages, and in accordance with the purpose of the invention as embodied and described herein, the present invention provides an electrochemical cell which includes a prismatic conductive container configured to have a substantially prismatic section, such as a rectangular section, and sidewalls, a closed bottom end and an open top end that is closed with a cover. The prismatic section houses the active materials of the cell including positive and negative electrodes, as well as a separator. The first electrode is disposed in the container substantially within the prismatic section and is disposed against inner walls of the conductive container such that the first electrode conforms to the prismatic section of the conductive container. The second electrode is disposed within an inner cylindrical volume of the prismatic section of the container. The cell is preferably assembled with a cover and seal assembly provided on the open top end of the container.

According to a further aspect of the present invention, a plurality of prismatic cells, such as rectangular cells, are assembled in a housing, such as a rectangular housing of a multiple cell battery. The cells are each configured with a prismatic section, such as a rectangular section, to allow multiple cells to be assembled close together and thereby optimize volume consumption within the battery housing.

These and other features, objects, and benefits of the invention will be recognized by those who practice the invention and by those skilled in the art, from reading the following specification and claims, together with reference to the accompanying drawings.

BRIEF DESCRIPTION OF THE DRAWINGS

In the drawings:

FIG. 2 is a top plan view of the battery of FIG. 1 showing the cells assembled in the battery housing;

FIG. 4 is an elevational view of one rectangular electrochemical cell with a round top end and adjoining round cover according to the present invention;

FIG. 5 is a top view of the electrochemical cell shown in FIG. 4;

FIG. 6 is a cross-sectional view of the electrochemical cell taken through lines VI—VI in FIG. 5;

FIG. 7 is a cross-sectional view of the electrochemical cell taken through lines VII—VII in FIG. 4; and FIG. 8 is a cross-sectional view of the electrochemical cell taken through lines VIII—VIII of FIG. 5.

DETAILED DESCRIPTION OF THE PREFERRED EMBODIMENTS

Figures 1, 3:
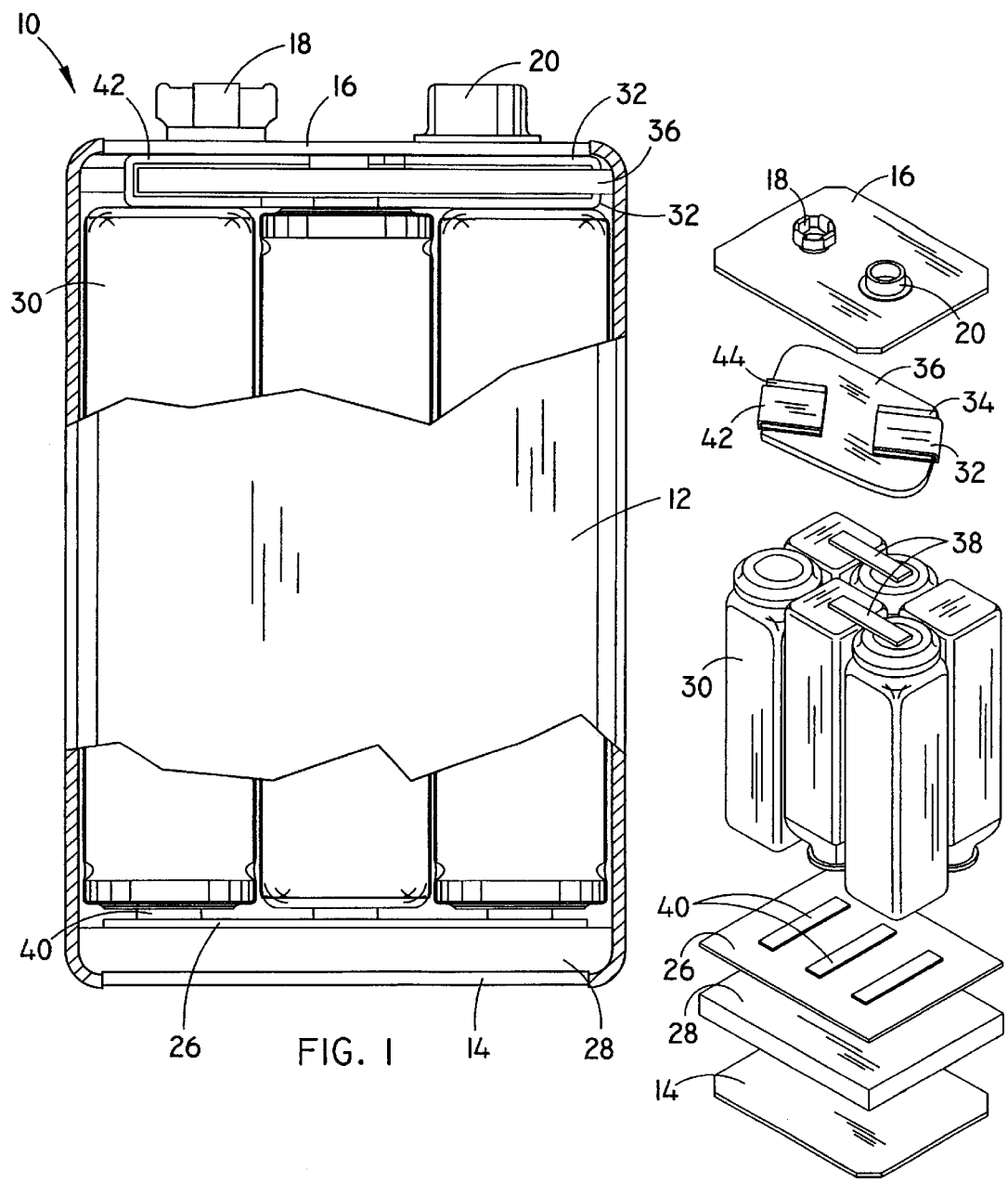
FIG. 1 is a partial perspective view of a rectangular battery having six rectangular electrochemical cells with round covers and assembled according to the present invention.
FIG. 3 is a partial exploded view of the battery of FIG. 1.

Referring now to FIG. 1, a multiple cell battery 10 is shown having a rectangular housing 12, preferably including a metal jacket, with a non-conductive coating, defining four sidewalls and top and bottom terminal boards 14 and 16 defining the respective top and bottom surfaces. The battery 10 has positive and negative contact terminals 18 and 20 assembled to the top terminal board 16 via rivets (not shown). According to the embodiment shown and described herein, the size and shape of the housing 12, as well the location of the positive and negative contact terminals 18 and 20, is provided in accordance with the standard commercially available 9-volt rectangular battery according to current industry standards. Nine-volt rectangularly housed batteries of this size and shape are widely available, particularly for use with smoke detectors and portable electronic devices.

While a rectangular configured cell and a rectangular battery housing multiple rectangular cells are shown and described herein according to the preferred embodiment, it should be appreciated that the teachings of the present invention are not limited to the specific embodiments shown. The teachings of the invention may be applicable to various multiple cell battery housings and various electrochemical cell configurations having a generally prismatic shape. Additionally, the present invention is not limited to the alkaline cell having manganese dioxide/zinc, as various other cells may be used, such as carbon/zinc, nickel metal/hydride, nickel/cadmium, nickel/zinc, cells containing lithium, as well as other electrochemical cells. The cell of the present invention may be constructed as a bobbin type cell, a jelly roll type cell, or may incorporate flat plate construction, all of which types of cells are known in the art.

According to the preferred embodiment, the battery 10 houses a plurality of rectangular cells 30 each having a prismatic section and a round end, according to the present invention. The rectangular cells 30 are advantageously assembled parallel to each other in a compact relationship such that adjacent cell walls are close together and preferably abut each other and the remaining cell walls closely abut the interior sides of the housing so as to fit compactly within battery housing 12. This configuration maximizes volume consumption of housing 12 which allows for realization of increased performance achievable for a given size battery housing. Accordingly, the series connected cells 30 substantially consume the internal volume of housing 12 so as to substantially fully utilize the space available in a standard size battery housing.

Referring particularly to FIG. 2, the assembly of cells 30 within housing 12 are seen from a top view with the top terminal board 16 and top cover assembly removed. The six cells 30 are assembled side-by-side in a 3×2 array and substantially consume the available volume within rectangular housing 12 of battery 10. The six cells 30 are arranged within housing 12 in an alternating fashion such that the positive and negative terminal ends of cells 30 are flip-flopped relative to adjacent cells. The cells 30 are electrically interconnected in series such that battery 12 provides a battery supply voltage across terminals 18 and 20 equal to the total aggregate voltage supply of the cells 30. According to one example, each of the six cells 30 supplies an approximate 1.5 volts, thereby providing an approximate 9-volt battery voltage supply.

With particular reference to FIG. 3, the multiple-cell battery 10 and assembly thereof is shown in an exploded view with the metal jacket walls of housing 12 removed. Cells 30 are disposed in contact with bottom conductive contact strips 40 on the bottom side and top conductive contact strips 38 on the top side, which provide a series interconnection of the cells 30. Contact strips 40 are assembled on a thin insulating paper 26 which, in turn, is disposed on the top surface of a resilient pad 28. Resilient pad 28 lies on top of the bottom terminal board 14 of battery 10. Resilient pad 28 preferably includes a rubber material which provides a spring-like surface. When compressed, resilient pad 28 forcibly urges contact strips 40 against the corresponding terminals on the cells 30 on the bottom side, while also forcibly urging the upper terminals of cells 30 against contact strips 38 on the top side. This pressure contact ensures a continuous series electrical interconnection of the multiple cells 30. Although the conductive contact strips provide pressured contact against the cells, it should be appreciated that one or more of the contact strips could be soldered or welded to the cells using conventional methods.

Contact strips 38 similarly are assembled to contact the corresponding terminals on the top side of cells 30. Contact strips 38 are disposed below a support pad 36, which may include cardboard. Disposed about opposite corners of support pad 36 are metal contact pads 32 and 42, which wrap around the top and bottom sides of support pad 36. Contact pads 32 and 42 are assembled on top of thin layers of insulating paper 34 and 44, respectively. Metal contact pad 32 directly contacts both the positive terminal of one cell 30 and the positive contact terminal 20 of battery 10. Metal conductive pad 42 directly contacts both the negative terminal of another cell 30 and the negative contact terminal 18 of battery 10. The two cells 30 in contact with contact pads 32 and 42 are at opposite ends of the series electrical interconnection. Accordingly, positive and negative contact terminals 20 and 18, respectively, provide a voltage potential across the series electrical interconnection of cells 30.

Referring to FIG. 4, one of the electrochemical cells 30 is shown configured with a rectangular steel can 60 having an open round top end for receiving a round cover according to the present invention. Steel can 60 has a rectangular section 50 extending along a vast majority of the length of the cell and transitions to a round end 52 provided at the top end. The rectangular section 50 of cell 30 has four substantially planar rectangular sidewalls and a substantially rectangular radial cross section with rounded corners. Rectangular section 50 transitions to the round top end 52 via a bottleneck section 54. The round top end 52 of can 60 extends from the rectangular section 50 with a taper neck and allows a round cover and seal assembly 56 to be easily welded, attached by adhesive or otherwise assembled to the round top end. In addition, the bottleneck section 54 of steel can 60 may also include a substantially cylindrical section that transitions from the tapered bottleneck section 54 at one end and provides the round opening at the other end. The cylindrical section is preferably short in length and allows the round cover 56 to matingly engage and seal closed the open round end.

The cell 30 has a bottom end 58 defined by the bottom side of the rectangular section 50. The bottom end 58 serves as a positive cover to provide a positive cell terminal. At the top end of the cylindrical section 52 is cover and seal assembly 56 with a substantially rounded shape which includes a negative cell cover or terminal 62. The top end of cell 30 is further shown in FIG. 5. According to the configuration shown, cell 30 realizes increased volume in the rectangular section 50 in contrast to the conventional cylindrical cell used in a rectangular battery, while having a round top end 52 that easily accommodates the standard round negative cover and seal assembly 56. This allows for an increase in active cell materials over that of the conventional cylindrical cell of a size having a diameter equal to the width of the sidewalls of the rectangular section 50.

Referring to FIGS. 6 and 8, the electrochemical cell 30 is further illustrated in cross-sectional views taken along the longitudinal axis of the cell 30 and at an angular displacement of forty-five degrees relative to the two views. The cell 30 includes steel can 60 having a rectangular shape with a closed bottom end 58 forming a positive terminal and having a seal assembly 56 with outer negative cover 62 assembled on the top end of the cell 30. A thin layer of shrink tube insulation 72 covers the sides of steel can 60 to electrically insulate the metal casing of the cell from adjacent cells and also from the housing 12 of battery 10. A positive electrode, referred to herein as cathode 64, preferably formed of a mixture of manganese dioxide, graphite, potassium hydroxide solution, deionized water, and other additives is formed about and abuts the interior side surface of steel can 60. A cup-shaped separator 66, which is preferably formed of a non-woven fabric that prevents migration of any solid particles in the battery, is disposed about the interior surface of cathode 64. A negative electrode, referred to herein as anode 68, such as a gelled anode, is injected into or otherwise disposed within the interior of the cup-shaped separator 66. Disposed within anode 68 is a current collector 70 in contact with zinc concentration in anode 68. The current collector 70 provides a negative contact to the negative cell terminal 62. The active materials of cell 30, including the anode 68 and cathode 64, are substantially disposed within the rectangular section 50.

The cover and seal assembly 56 provides a closure to the assembly of cell 30 and includes a seal body 76 and compression member 74. The seal body 76 is generally shaped like a disk and made from electrically non-conductive material. The compression member 74 is a tubularly-shaped metallic component that compresses the seal body 76 around the current collector 70. The seal assembly 56 also includes the outer negative cover 62 welded to the exposed end of the current collector 70 to form the cell's negative terminal. The rim of steel can 60 is crimped inwardly toward the cell body to form a seal. The seal assembly 56 with cover 62 may include a conventional round assembly, such as that disclosed in U.S. Pat. No. 5,422,201, which is hereby incorporated by reference.

According to one embodiment, the rectangular section 50 of cell 30 has a substantially square radial cross section with rounded corners and equal width W sidewalls, as shown in FIG. 7. It should be appreciated that the negative electrode, referred to as the anode 68, is preferably disposed in the inner cylindrical volume of the rectangular section 58 of steel can 60, while the positive electrode, referred to as the cathode 64, fills the volume between separator 66 and the interior walls of steel can 60, including the four corners of can 60. By providing a rectangular configuration, the volume within the rectangular section 50 of cell 30 is larger than that of a conventional cylindrical cell having dimensions that would fit within the rectangular walls of cell 30. This allows for an increase in the volume of the cathode 64 as well as the anode 68. In addition, the cup-shaped separator 66 may be further disposed radially outward from the longitudinal axis of cell 30 so as to provide a greater anode-to-cathode interface surface area separating the anode 68 and cathode 64 from each other. It should be appreciated that the additional active materials, including those disposed within the corners of the cathode 64, discharge to increase the capacity of cell 30.

According to one example, a cell 30 having a square cross section can experience a gain in service performance by as much as approximately twenty-five percent (25%) over the performance experienced with a cylindrical cell having a diameter equal to the width W of the sidewalls of the rectangular section. The rectangular configuration of cell 30 according to the present invention allows for approximately twenty-one to twenty-five percent (21%–25%) more active cell materials to be used and allows for an approximate twelve percent (12%) increase in anode-to-cathode interface surface area. Cathode-to-can contact resistance is a significant factor in high current discharge of conventional cylindrical cells. With the square cross section of cell 30 of the present invention, the cell 30 may achieve up to a twenty-seven percent (27%) lower contact resistance because the can-to-cathode contact area is increased up to twenty-seven percent (27%).

The cell 30 can be assembled by starting with a cylindrical steel can having a closed bottom end and an open top end. According to this embodiment, the cylindrical steel can is reshaped in a rectangular configured mold to form the rectangular section 50. According to one assembly approach, the materials of cathode 64 are dispensed within the cylindrical can and the can is thereafter disposed within the rectangular configured mold. A ramrod, which sealingly engages the can with a stripper ring, can, be forcibly injected into the can with sufficient force to form a cylindrical passage for the separator and anode, while at the same time forcing a portion of the cylindrical can to be reshaped into a rectangular section as defined by the surrounding rectangular mold. Once this is achieved, the ramrod can be removed and the separator 66 and anode 68 disposed in the cylindrical opening. Thereafter, the collector 70 is inserted into place and the cover and seal assembly 56 with outer negative cover 62 is assembled to the can. Alternatively, the assembly of cell 30 could include starting with a rectangular steel can having a rectangular closed bottom end and a rectangular open top end, and reshaping the open rectangular top end of the rectangular can to form a round top end. It should also be appreciated that the steel can 60 of cell 30 could otherwise be manufactured in a mold to include both the rectangular section 50 and round open end.

It should be appreciated that the cell 30 of the present invention can be suitably manufactured in accordance with an impact mold manufacturing process. According to one impact mold manufacturing process, the cathode mix is dispensed within the can and a ramrod is forcibly injected into the cathode mix and removed to form a cylindrical passage extending centrally through the cathode, thereby molding under impact a cylindrical-shaped anode cavity. The separator 66 and anode 68 are then disposed within the volume of the cavity. It should be further appreciated that the impact molding assembly process can further be utilized to reshape a cylindrical steel can into the rectangular section 50, as described above.

While cell 30 is shown and described in connection with one embodiment having a rectangular section with a square radial cross section, it should be appreciated that a rectangular radial cross section with unequal sides or other non-round prismatic section may be employed without departing from the teachings of the present invention. In addition, it should be appreciated that an electrochemical cell with a prismatic housing having a tapered bottleneck section leading to a round end can be used as a component of a single cell battery or a multiple cell battery, without departing from the spirit and scope of the present invention.

The electrochemical cell 30 of the present invention preferably includes a non-cylindrical section having one or more substantially flat sidewalls extending parallel to the longitudinal axis of the cell 30. It is further preferred that the non-cylindrical section of cell 30 have multiple, substantially planar sidewalls which provide a non-round radial cross section having substantially straight sides, and may or may not include rounded corners. The substantially planar sidewalls are particularly advantageous in allowing for multiple cells to be arranged to conform compactly together within a given housing such that cell walls of adjacent cells may be arranged juxtaposed. According to an embodiment shown herein, the non-cylindrical section has four planar sidewalls configured as a rectangular radial cross section. However, the non-cylindrical section may include various prismatic configurations. Prismatic, as used herein, is intended to include a number of possible geometric configurations having at least one substantially planar surface, and preferably having three or more substantially planar surfaces.

According to another embodiment, cell 30 has a prismatic radial cross section configured as a pentagon having five, substantially planar and equal sides. Yet, according to other embodiments of cell 30, the prismatic radial cross section may include a six-sided hexagon, a seven-sided neptagon, or an eight-sided octagon. According to the aforementioned configurations of a pentagon, hexagon, neptagon, and octagon, such cells may easily be arranged together in a honeycomb arrangement to form a multiple cell battery such that adjacent cell walls of adjacent cells abut one another to maximize use of the available volume within a multiple cell battery housing. It should further be appreciated that a varying number of sidewalls may be employed in accordance with various polygon configurations to provide prismatic radial cross section configurations of the cell 30 according to the present invention.

The electrochemical cell 30 of the present invention employs a prismatic radial cross section which has an effective maximum radial cross-sectional area that is greater than the cross-sectional area available with a conventional cylindrical cell having a cylindrical radial cross section with an effective diameter $D_{\mathit{eff}}$ equal to the width W of the prismatic radial cross section of cell 30. For example, the conventional cylindrical cell has a radial cross-sectional area defined by $$\frac{\pi D_{\mathit{eff}}^2}{4}.$$

In contrast, cell 30 of the present invention with the prismatic radial cross section has a radial cross-sectional embodiment, the radial cross-sectional area is substantially defined by the width W of one wall multiplied by the width W of the adjoining wall. Using this width dimension W, a cylindrical cell having the effective diameter $D_{\mathit{eff}}$ provides a lesser radial cross-sectional area and therefore a lesser volume which limits the amount of materials to be disposed within the cell and thereby limits the service performance of the conventional cylindrical cell. By providing multiple, substantially planar surfaces as defined herein, the present invention realizes a cell that may fit within a standard battery housing, such as that provided with a battery-operated electrical device, while providing enhanced service performance to the device.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
    a conductive container having a substantially prismatic section with sidewalls providing a substantially prismatic radial cross section, said container further having a closed bottom end, and an open top end;
    a first electrode disposed in said container within said prismatic section and having an outer surface disposed against an inner surface of the prismatic section of said conductive container such that said outer surface of said first electrode conforms to the shape of the inner surface of the prismatic section of the conductive container;
    a second electrode disposed within an inner cylindrical volume formed in the first electrode within said prismatic section of said container;
    a separator disposed between said first electrode and said second electrode; and
    a cover assembled on the open top end of said container.

2. The electrochemical cell as defined in claim 1, wherein said second electrode is disposed within a single cylindrical cavity centrally formed in said first electrode.

3. The electrochemical cell as defined in claim 1, wherein said substantially prismatic section comprises a substantially rectangular section.

4. The electrochemical cell as defined in claim 1, wherein said conductive container comprises a steel can.

5. The electrochemical cell as defined in claim 1, wherein said first electrode comprises a cathode and said second electrode comprises an anode.

6. The electrochemical cell as defined in claim 1, wherein one of said first and second electrodes comprises zinc and the other of said first and second electrodes comprises manganese dioxide.

7. The electrochemical cell as defined in claim 6 further comprising an alkaline electrolyte.

8. An alkaline electrochemical cell comprising:
    a conductive can having a prismatic section with sidewalls providing a prismatic radial cross section, said conductive can further having a closed bottom end, and an open top end;
    a cathode disposed in said conductive can within said prismatic section and including manganese dioxide, said cathode having an outer surface contacting an inner surface of said prismatic section of the conductive can and substantially conforming to the shape of the inner walls of the prismatic section of the conductive can;
    an anode disposed in an inner cylindrical volume formed in the cathode and including zinc, wherein said cathode and anode substantially consume the volume of said non-cylindrical section of said conductive can;
    a separator disposed between said anode and said cathode;
    an alkaline electrolyte; and
    a cover assembled to said open top end of said conductive can.

9. The electrochemical cell as defined in claim 8, wherein said anode is disposed within a single cylindrical cavity centrally formed in said cathode.

10. The electrochemical cell as defined in claim 8, wherein said prismatic section comprises a substantially rectangular section.

11. The electrochemical cell as defined in claim 8, wherein said conductive can comprises a steel can.

12. A multiple cell battery comprising:
    a battery housing;
    a positive contact terminal;
    a negative contact terminal; and
    a plurality of electrochemical cells assembled in said housing and in electrical contact with said positive and negative contact terminals, each of said plurality of cells comprising a conductive container having a prismatic section with a substantially prismatic, radial cross section and housing a first electrode and a second electrode, wherein the first electrode is disposed in the container within said prismatic section and has an outer surface disposed against an inner surface of the prismatic section of the conductive container such that the outer surface of said first electrode conforms to the inner surface of the prismatic section of the conductive container, and said second electrode is disposed within an inner cylindrical volume formed in the first electrode within said prismatic section of the container, wherein said container further has an open end and a cover assembled to the open end.

13. The battery as defined in claim 12, wherein said substantially prismatic radial cross section comprises a substantially rectangular section.

14. The battery as defined in claim 13, wherein said battery housing comprises a rectangular housing.

15. The battery as defined in claim 13, wherein said substantially rectangular section comprises a substantially square cross section.

16. The battery as defined in claim 12, wherein said plurality of cells are electrically connected in series.

17. The battery as defined in claim 12, wherein said first electrode comprises a cathode and said second electrode comprises an anode.

18. The battery as defined in claim 17, wherein said first electrode includes manganese dioxide and said second electrode includes zinc.

19. The battery as defined in claim 18, wherein each of said plurality of cells further comprises an alkaline electrolyte.

20. The battery as defined in claim 12, wherein said second electrode is disposed within a single cylindrical cavity centrally formed in said first electrode.

* * * * *